United States Patent [19]

Holzwarth et al.

[11] 4,425,246

[45] Jan. 10, 1984

[54] OIL RECOVERY USING STABILIZED SALINE HEAT-TREATED HETEROPOLYSACCHARIDE SOLUTIONS

[75] Inventors: George M. Holzwarth, Linden; Lars A. Naslund, Morganville, both of N.J.; Erik I. Sandvik, Houston, Tex.

[73] Assignee: Exxon Research & Engineering Co., Florham Park, N.J.

[21] Appl. No.: 303,413

[22] Filed: Sep. 18, 1981

[51] Int. Cl.³ .............................................. E21B 43/22
[52] U.S. Cl. ................................ 252/8.55 D; 166/246; 536/114
[58] Field of Search ................... 252/8.55 D; 166/246; 536/114; 53/403

[56] References Cited

U.S. PATENT DOCUMENTS

| | | | |
|---|---|---|---|
| 3,625,888 | 12/1971 | Redmore et al. | 252/8.55 D |
| 3,634,232 | 1/1972 | Dunlop | 252/8.55 D |
| 3,764,548 | 10/1973 | Redmore | 252/188 |
| 3,800,877 | 8/1974 | Knight | 166/305 |
| 3,801,502 | 4/1974 | Hitzman | 252/8.55 D |
| 3,976,593 | 8/1976 | Hartke et al. | 252/391 |
| 4,182,860 | 6/1980 | Naslund et al. | 536/114 |
| 4,218,327 | 8/1980 | Wellington | 252/8.55 D |
| 4,256,590 | 3/1981 | Naslund et al. | 252/8.55 D |
| 4,299,825 | 11/1981 | Lee | 252/8.55 D |

FOREIGN PATENT DOCUMENTS

| | | | |
|---|---|---|---|
| 1518628 | 7/1978 | United Kingdom | |
| 2036056 | 6/1980 | United Kingdom | 252/8.55 D |

OTHER PUBLICATIONS

Lipton, "Improved Injectibility of Biopolymer Solutions", SPE Paper No. 5099, 49th Annual Meeting SPE of AIME, Houston, 1974, p. 3.

Patton, "Chemical Treatment Enhances Xanflood Polymer", SPE Paper No. 4670, 48th Annual Meeting of SPE of AIME, Las Vegas, 1973, p. 3.

*Primary Examiner*—Herbert B. Guynn
*Assistant Examiner*—Howard J. Locker
*Attorney, Agent, or Firm*—James H. Takemoto; Jay Simon

[57] ABSTRACT

A process for recovering crude oil from a subterranean formation using aqueous saline heteropolysaccharide solutions containing at least 0.5 wt. % of inorganic salts which are stabilized against viscosity loss on heat treatment. The stabilization process comprises preparing an aqueous solution containing heteropolysaccharide and inorganic salts, removing oxygen from the saline solution, heating to a temperature of at least 100° C. in an inert atmosphere, then removing cell debris. The solutions also have improved filterability and are free of cell debris.

12 Claims, No Drawings

OIL RECOVERY USING STABILIZED SALINE HEAT-TREATED HETEROPOLYSACCHARIDE SOLUTIONS

BACKGROUND OF THE INVENTION

This invention relates to oil recovery using stabilized modified heteropolysaccharides. More particularly, saline heteropolysaccharide solutions containing at least 0.5 wt.% of inorganic salts are stabilized against viscosity loss upon heat treatment if oxygen is removed from the saline solution prior to and during heat treatment. The stabilized solutions are used as mobility control agents for oil recovery.

British Pat. No. 1,518,628 discloses that a viscosity stabilized, aqueous polysaccharide solution can be prepared if the aqueous liquid is first treated to remove dissolved oxygen, followed by addition of a water-soluble, sulfur-containing antioxidant, and a water-soluble readily oxidizable alcohol. The aqueous liquid is any fresh or saline water but is preferably a relatively soft water having a total dissolved salt content of not more than about 5,000 ppm and a hardness of not more than about 500 ppm. Lipton, SPE paper No. 5099, 49th annual meeting of SPE of AIME, Houston (1974) teaches that the injectability of the biopolymer derived from *Xanthomonas campestris* can be improved by proper mixing techniques, surface preservation and use of bacterial-free systems. Oxygen scavengers are added to prevent gel formation associated with the presence of $Fe^{3+}$ ions. The oxygen scavenger prevents oxidation of $Fe^{2+}$ to $Fe^{3+}$. Patton, SPE paper No. 4670, 48th annual meeting of SPE of AIME, Las Vegas (1973) discloses that caustic treatment produces more filterable solutions. Sparged steam is recommended as a heating and deaerating agent to avoid local overheating and oxidative polymer decomposition. U.S. Pat. No. 3,800,877 describes the improved mobility control of aqueous solutions containing partially hydrolyzed polyacrylamides by incorporating water-soluble aldehydes into the aqueous solution. The aldehydes are stated to form complexes with oxygen thus overcoming the adverse effects of oxygen on the mobility control agent.

U.S. Pat. Nos. 3,625,888 and 3,764,548 both relate to oxygen scavenger compositions which are useful for reducing or inhibiting the corrosive effects of oxygen in water-flooding processes on oil field equipment. U.S. Pat. No. 3,976,593 teaches that bisulfites of corrosion inhibiting amines function as both corrosion inhibitor and oxygen scavenger. This system can be used in water-flooding processes for oil recovery.

Finally, U.S. Pat. No. 4,182,860 and 4,256,590 concern a method of producing a modified heteropolysaccharide which can be readily filtered and separated from other cell debris. The process involves the preparation of an aqueous, saline heteropolysaccharide solution containing at least 0.5 wt.% of at least one inorganic salt and heat treatment at temperatures of at least about 100° C.

The process of U.S. Pat. No. 4,182,860 suffers from the disadvantage that prolonged heating at high temperatures results in a gradual loss of viscosity over a period of time. There is a need for a modified saline heteropolysaccharide which has stable viscosity properties at high temperatures for prolonged periods of time, particularly with respect to use in enhanced oil recovery from high temperature formations.

SUMMARY OF THE INVENTION

It has been discovered that heat treatment of at least 100° C. on aqueous saline heteropolysaccharide solutions containing at least 0.5 wt.% of inorganic salts for prolonged periods of time produces an improved modified heteropolysaccharide mobility control agent for oil recovery having improved filterability and injectivity but does not result in impairment of viscosity imparting properties if oxygen is removed from the aqueous solution prior to commencing the heating step. Accordingly, the process of the invention for recovering crude oil from a subterranean formation comprises injecting an amount effective to provide mobility control of an aqueous solution containing a heteropolysaccharide produced by the action of bacteria of the genus Xanthomonas, driving the displaced oil through the formation and recovering the displaced oil, wherein said heteropolysaccharide is stabilized against viscosity loss on heat treatment, is free of cell debris, has improved filterability, and has been prepared by a process which comprises the steps of:

(a) preparing an aqueous solution which contains (i) from about 200 to about 30,000 parts per million by weight, of a heteropolysaccharide product produced by the bacterial fermentation of bacteria of the genus Xanthomonas, and (ii) at least about 0.5 weight percent of at least one inorganic salt to obtain a saline heteropolysaccharide solution;

(b) removing oxygen from said saline heteropolysaccharide solution; P1 (c) heating said saline heteropolysaccharide solution to a temperature of at least about 100° C. in an inert atmosphere;

(d) maintaining said saline heteropolysaccharide solution at a temperature of at least about 100° C. for a period of time sufficient to increase the injectivity and filterability characteristics of the heteropolysaccharide; and (e) removing or separating the proteinaceous materials and/or residual whole bacterial cells or other cell debris from the saline and heat-treated heteropolysaccharide product to thereby obtain a modified heteropolysaccharide capable of imparting a viscosity of at least 4.0 centipoises to an aqueous test solution containing 2 weight percent NaCl and 0.2 weight percent $CaCl_2$ when said modified heteropolysacchride is added to said solution at a concentration of approximately 600 parts per million, by weight, as measured on a Brookfield viscosimeter with a UL adapter at 60 rpm at 25° C. and said modified heteropolysaccharide is further capable of imparting a filterability such that more than 1000 ml of a different aqueous test solution containing 8.8 weight percent salt comprised of NaCl and $CaCl_2$ on a 10:1 weight ratio and approximately 600 parts per million concentration, by weight, of said modified heteropolysaccharide will pass without plugging through a Millipore ® filter having a diameter of 13 mm and a pore size of about 5 microns at a constant pressure drop of about 1.55 psig.

DETAILED DESCRIPTION OF THE INVENTION

Oxygen is removed from the saline heteropolysaccharide solution prior to heating by adding an oxygen scavenger and/or deoxygenating the aqueous solution containing the heteropolysaccharide by purging with inert gas.

The first method involves chemically removing oxygen by reaction with an oxygen scavenger. Such oxygen scavengers are well known in the art and are typically strong reducing agents. Examples include dithionates, dithionites, sulfites, bisulfites, transition metal complexes, aldehydes, hydroxylamine, hydrazine and the like. Preferred oxygen scavengers are sulfites, bisulfites, dithionites and dithionates. Oxygen scavengers are added in an amount sufficient to deoxygenate the saline heteropolysaccharide solution. A large excess over the stoichiometric amount required for deoxygenation is suitable with a 10-100% excess being preferred.

Oxygen can be removed physically by purging the saline heteropolysaccharide solution with inert gas such as nitrogen, argon, helium, hydrocarbons, or other non-reactive, $O_2$-free gases. Nitrogen and methane are preferred gases. It is preferred to maintain an inert atmosphere over the saline heteropolysaccharide solution during the heating step.

A combination of the two methods of oxygen removal is also suitable, i.e., purging the saline heteropolysaccharide solution with inert gas and adding a chemical oxygen scavenger. This permits rapid and efficient removal of oxygen while at the same time protecting the solution against further contact with an oxygen source.

The heteropolysaccharides are generally fermentation products produced by the action of bacteria of the genus Xanthomonas on carbohydrates. Typical carbohydrates are glucose, sucrose, fructose, maltose, lactose, soluble starches and the like. Preferred carbohydrates are commercially available unrefined products such as raw sugar, molasses and the like. Representative species of these bacteria include *Xanthomonas campestris, Xanthomonas phaseoli, Xanthomonas malvacearum, Xanthomonas carotae, Xanthomonas translucens, Xanthomonas hederae, Xanthomonas papavericola, Xanthomonas begoniae,* and *Xanthomonas incanae. Xanthomonas campestris, Xanthomonas begoniae,* and *Xanthomonas incanae* are preferred species.

Heteropolysaccharide solutions are produced from a fermentation medium using techniques well known in the art. The resulting fermentation broth or beer is then subjected to a saline heat treatment which is described in the following paragraph. Alternatively, the heteropolysaccharide may first be recovered from the fermentation broth by precipitation, drying and grinding. In this case, the dried heteropolysaccharide must be redissolved in water or brine prior to heat treatment.

The salinity of the broth or beer is adjusted to bring the salt concentration to a level of about 0.5 wt.% or higher. For reasons not completely understood, these salts help protect the heteropolysaccharide from thermal degradation during heat treatment. Salt concentrations as low as 0.5 wt.% have been found effective, although salt concentrations on the order of 2 wt.% are generally preferred. Higher salt concentrations, up to the solubility limit of salt in the fermentation broth, do not adversely affect the solution. However, salt concentrations in excess of the solubility limit can, of course, interfere with the separation of the heteropolysaccharide from other components of the fermentation solution. Generally, it will be preferred to maintain the salt concentration at a level below 10 wt.% to avoid precipitation of inorganic salts and to avoid phase separation of the fermentation solution.

The salt solution employed in the saline heat treating can be any one of a number of readily available and inexpensive substances. Inorganic salts containing sodium, calcium, magnesium, potassium, and barium as a cation and chloride, sulfate, carbonate, bicarbonate, and phosphate as an anion are suitable in the practice of this invention. However, salts such as sodium chloride and calcium chloride are generally preferred since they are readily available, relatively inexpensive and are compatible with most subterranean formations which is desirable when the polymer is to be used for oil recovery purposes. The salt chosen for use in this invention should, of course, be soluble to the desired level at the treatment temperature and should be stable. The salt should not be highly corrosive, toxic, or detrimental to the polymer in the solution. In the final analysis, the salt should be capable of protecting the polymer from degradation during heating. Simple viscosity measurements will enable one skilled in the art to determine whether a given salt is adequately performing this function.

During the saline heat treatment step, thermal energy is applied to the heteropolysaccharide-containing solution. In practical applications, the temperature will be in the range of 100° C. to 180° C. and the temperature will be maintained within this range for a time period of at least one minute, preferably 60 to 400 minutes. In the saline heat treatment described in U.S. Pat. No. 4,182,860, heat treatments for prolonged periods were undesirable due to a decrease in the viscosity properties of the heteropolysaccharide. On the other hand, longer heating times are desirable for improved filterability. Deoxygenating the saline solution according to the present invention helps to stabilize the viscosity imparting properties of heteropolysaccharides by substantially reducing or preventing thermal degradation. This permits longer heat treatments to improve filterability and injectivity without impairing viscosity.

It may be desirable to mechanically shear the heteropolysaccharide solution either before or after it has been subjected to the saline heat treatment. This shear can be conveniently imposed on the solution by a mechanical agitator, passing the solution through an orifice plate or other conventional means. Such shearing is not essential to the practice of this invention, but it assists in assuring that the components of the solution are totally solubilized, and it aids in subsequent operations.

Upon completion of the saline heat treatment, the crude heteropolysaccharide can be separated from the bacterial cells by centrifugation or filtration, if desired. Precipitation with methanol, ethanol, isopropanol, acetone, or similar agents permits the isolation of a relatively pure heteropolysaccharide. A biocide may also be added. The biocide is not essential to the practice of the invention but does protect the polymer solution from microbial degradation and improves its shelf life. Such biocides include any of a great variety known to the art. If the biocide to be used is heat-stable and will withstand the conditions of the particular saline heat treatment to be used, it may be added to the heteropolysaccharide solution prior to the heat treatment step. Alternatively, biocide addition may be made after any desired dilution of the heat treated heteropolysaccharide solution has been accomplished.

Heat treating in a saline solution with subsequent filtration can be incorporated in the process steps for producing commercial grade heteropolysaccharide or alternatively, commercial grade heteropolysaccharide can be produced and then subjected to the treating process of this invention. For example, commercially available heteropolysaccharide can be obtained from a number of sources such as the products sold under the trade name Kelzan XC by Kelco Company. The commercial grade heteropolysaccharide is dissolved in distilled or fresh water in a concentration of 200 to 30,000 parts per million with the addition of from 0.5 to 10 weight percent salts. This solution is heated to a temperature ranging from 100° C. to 180° C. for a period of time ranging from 1 to 300 minutes. The heteropolysaccharide solution can then be subjected to mechanical separation to remove all entrained residual material such as clumps of incompletely solubilized heteropolysaccharide, residual proteinaceous material, and residual whole bacterial cells or other cellular debris. Further details concerning the saline heat treatment may be found in U.S. Pat. No. 4,182,860 which is incorporated herein by reference.

Improved viscosity and injectivity properties for heteropolysaccharides are particularly important in oil recovery applications. Heteropolysaccharides have frequently been incorporated into secondary and tertiary recovery methods for providing mobility control.

The techniques of secondary and tertiary oil recovery using heteropolysaccharides as mobility control agents are well known. In typical secondary recovery operations, a water or brine pre-flush is followed by a waterflood wherein the heteropolysaccharides are added to the waterflood to provide mobility control, i.e., to increase the viscosity of waterflood to value greater than that of displaced oil in order to minimize "fingering" effects which arise when a less viscous fluid is used to displace a more viscous fluid. Surfactants are typically added to waterfloods to improve the efficiency of the waterflooding process. If surfactants are added, then a slug mode of operation is usually employed. The surfactant-containing slug is driven to production means using a thickened or unthickened water or brine.

Tertiary recovery processes conventionally employ microemulsions as displacing agents. Microemulsions refer to a stable, transparent or translucent micellar solution or dispersion of oil, water or brine and at least one surfactant. A slug containing the displacing agent is injected into the formation through at least one injection means in an amount effective to displace oil. A driving fluid is then used to push the displaced oil to production means. Heteropolysaccharides may be incorporated into the displacement fluid, the drive fluid or both as a means of providing mobility control.

Surfactants employed are those known in the art, and are anionic, cationic, nonionic, amphoteric or mixtures thereof. Surfactant floods may also contain other additives such as co-surfactants and/or co-solvents.

The invention is further illustrated by the following examples.

EXAMPLE 1

This example illustrates the saline heat treatment on a commercially available heteropolysaccharide sold by Kelco Co. under the trade name Kelzan ®XC without addition of oxygen scavenger. Kelzan ®XC was added to two liters of distilled water to achieve a final concentration of 3,000 ppm. This mixture was stirred for at least 18 hours with a magnetic stirrer, and the salt concentration was subsequently adjusted to 2 wt.% NaCl and 0.2 wt.% CaCl$_2$ (total salt concentration of 2.2%). After stirring an additional two hours, the solution was separated into 500 ml batches and sheared in a Waring Blender ® at 19,000 rpm for three minutes. The capped sheared solutions were heated in an autoclave in the presence of air at 121° C. for one hour. After cooling, prefiltration through an AP25 Millipore ® prefiltration pad, and shearing for an additional one minute, the so-treated solutions were sequentially filtered through a series of Millipore ® filters having pore sizes of 1.2$\mu$, 0.8$\mu$, 0.65$\mu$ and 0.45$\mu$ respectively. Viscosities were then measured on a Fann Model 35 Viscometer at 25° C. and a shear rate of 52 sec$^{-1}$. An average viscosity ratio of 0.875 was observed, the ratio being determined as follows:

$$\text{viscosity ratio} = \frac{\text{viscosity after final filtration}}{\text{viscosity just before heat treatment}}$$

EXAMPLE 2

The procedure of Example 1 was repeated except that 2000 ppm of a trichlorophenol biocide solution sold by Exxon Chemical Co. under the trade name Corexit ® 7671 was added to the original heteropolysaccharide solution. An average viscosity ratio of 0.949 was determined. The decrease in viscosity loss upon heat treatment is probably a reflection of the fact that trichlorophenol, in addition to being a biocide, also possesses oxygen scavenging properties.

EXAMPLE 3

The improved viscosity resulting from the addition of a chemical oxygen scavenger is illustrated by this example. Example 2 was repeated except that 100 ppm Na$_2$S$_2$O$_4$ or 250 ppm NaHSO$_3$ was added to the heteropolysaccharide/biocide solution. Addition of 100 ppm of Na$_2$S$_2$O$_4$ resulted in an average viscosity ratio of 1.029 vs. a ratio of 1.037 for NaHSO$_3$. This data shows that addition of oxygen scavenger actually increased the viscosity imparting characteristics of the heteropolysaccharide upon a one-hour saline heat treatment at 121° C.

EXAMPLE 4

The effects of saline heat treatment as a function of time are illustrated by this example.

Heteropolysaccharide solutions were prepared from Kelco Co.'s Keltrol ® powder. The polysaccharide (1.5 g) was dissolved overnight in 450 ml H$_2$O with stirring using a 3" magnetic stir bar. To this solution was added 50 ml H$_2$O containing 10 g NaCl and 1.0 g CaCl$_2$ for final concentrations of 3000 ppm xanthan, 2% NaCl, 0.2% CaCl$_2$, pH 7±0.5. The solution was then heated at 121° C. in a one liter glass filterflask sealed with aluminum foil and Saran ® Wrap. Samples P, Q, R, S, and T were heated for 0, 1, 3, 5, and 7 hours, respectively. Samples Q-T were then filtered through 5, 1.2, 0.8, and 0.65$\mu$ Millipore ® filters to remove debris; Sample P was centrifuged for 30 minutes at 40,000 rpm (113,000×g average force) to remove debris.

For sedimentation and intrinsic viscosity experiments, a portion of each sample was then precipitated with ethanol, and redissolved in water, reprecipitated with ethanol to remove soluble nonpolysaccharide contaminants, then redissolved with water and dialyzed against 0.002 M NaCl.

The remaining 3000 ppm polysaccharide solution was then diluted to achieve a final solution containing 600 ppm xanthan, 8% NaCl, and 0.8% CaCl$_2$. This solution was stirred overnight, for use in the Millipore ® injectivity test.

Sedimentation studies were carried out in 14 ml tubes of a Beckman SW-40 preparative rotor at 40,000 rpm for 3.5 to 5 h, T=20° C. following covalent attachment of a fluorescent group to the Xanthan as described in Example XIV of U.S. Pat. No. 4,182,860 or Carbohydrate Research, 66, 173–186 (1978). Xanthan concentrations of about 5 ppm were used in the ½ ml starting band; this band moved through a 4 to 8% NaCl gradient containing 0.04 M NaH$_2$PO$_4$ buffer, pH 7. Band location after sedimentation was established by an Isco density gradient analyzer and a Perkin Elmer fluorescence spectrophotometer equipped with a flow cell. Fluorescence intensity distribution was then converted to a sedimentation coefficient distribution as described in the Carbohydrate Research article cited above.

Viscosity was measured by two different methods, using a Brookfield viscometer and a low-shear Cartesian diver viscometer. 3000 ppm xanthan solutions (heated and filtered) were diluted to a final concentration of 600 ppm xanthan in 8% NaCL, 0.8% CaCL$_2$, pH 6 to 7. A Brookfield viscometer with UL adapter (shear rates 7.3 to 73 sec$^{-1}$) was used at 20° C. to measure the viscosity of these solutions.

For molecular information, viscosity at very low shear stresses was measured with a rotating cylinder viscometer constructed using principles described by Gill and Thompson, Proc. Natl. Acad. Sci., 51, 562–566 (1967) and by Zimm et al., Macromol., 5, 471–481 (1972). The inner cylinder (rotor) is suspended in the test solution by a feedback-controlled pressure regulator (Cartesian diver principle). This type of suspension eliminates all sources of friction except the solution in question and removes the possibility of interference by films at soluition-air interfaces. The outer stationary cylinder is made of precision glass tubing. The rotor contains a lacquered aluminum ring to which a torque is applied by a rotating magnetic field. The rotating magnetic field is provided by the stator of a commercial electric motor. The driving torque on the aluminum ring in the rotor is varied by adjusting the electrical voltage applied to the motor windings. Shear stresses of 0.0025 to 0.01 dyne cm$^{-2}$ were employed; the corresponding shear rates were approximately 0.05 to 1 sec$^{-1}$. These shear stresses are so low that dilute xanthan solutions behave as Newtonian fluids. The sample temperature was 20° C.

A series of five xanthan samples were heated for 0, 1, 3, 5 and 7 h. For each sample, measurements were made of the Brookfield viscosity, the sedimentation coefficient $s_{20,W}$ and the intrinsic viscosity $[\eta]$. The results are given in Table 1.

The table shows that the Brookfield viscosity remains unaltered or increases slightly at 1 h treatment, then declines steadily. The injectivity of the five samples for these particular conditions demonstrate that it is unsatisfactory for the zero and 1 h samples, but after 3 h treatment, 1000 ml passes the low pressure 5 μm Millipore filter test.

In contrast to the results for the Brookfield viscosity, $s_{20,W}$ and $[\eta]$ decrease monotonically with heating time. Note particularly that heat treatment for 1 h causes $s_{20,W}$ to decrease from approximately 18.7 S to 14.4 S while $[\eta]$ decreases from approximately 10,500 to 8200 ml/g. The measurements of $s_{20,W}$ and $[\eta]$ are carried out at very low concentration or are extrapolated to zero concentration; they are therefore properties of individual molecules. The Brookfield viscosity is measured at high polymer concentration and high shear stress; intermolecular interactions therefore make a contribution to the measured values.

The molecular weight $M_{s\eta}$ of each sample can be evaluated from $s_{20,W}$ and $[\eta]$ with the Mandelkern-Flory-Scheraga equation, J. Chem. Phys., 20, 212–15 (1952), JACS, 75, 179–184 (1953):

$$M_{s\eta} = \left\{ \frac{S[\eta]^{\frac{1}{3}} \eta_o N_a}{\beta(1 - \bar{v}_2\rho)} \right\}^{\frac{3}{2}}$$

Here $\eta_o$ is the solvent viscosity, $v_2$ is the polymer partial specific volume (0.593 ml/g), $\rho$ is the solvent density (1.033 g/ml) and $\beta$ has a value of $2.5 \times 10^6$ when $[\eta]$ has the units dl/g.

The values of $M_{s\eta}$ obtained in this way are also given in Table 1; they decrease monotonically from $13-12 \times 10^6$ for native xanthan to $7.6-7.8 \times 10^6$ after a 1 h treatment and $1 \times 10^6$ after a 7 h treatment.

EXAMPLE 5

This Example illustrates the effects of an oxygen scavenger upon heating for 6 hours. Solutions were prepared in a nitrogen-flushed glove bag, as follows. First, 500 ml O$_2$-free water, prepared by bubbling N$_2$ through water for several days, was transferred to the flask. Oxygen scavenger (Na$_2$SO$_3$) was then added and allowed to react for 1½ h with residual oxygen in the water. 1.5 g powdered xanthan (Keltrol ®) was then added, and after dissolving for 1 h, salts were added. The flask was then closed with Saran ® Wrap and aluminum foil. After closure, the flask was removed from the glove box and heat-treated in the sterilizer. Filtrations (to 0.45 μm) and dilutions were done in air without special steps to exclude O$_2$. Samples are summarized as follows:

TABLE 1

EFFECT OF HEAT TREATMENT TIME

| Sample | Heating Time, h | Brookfield Viscosity, cp at 73 sec$^{-1}$ | Injectivity (ml thruput/ml min$^{-1}$ @ 100 ml) | $s_{20,W}{}^a$ Svedberg | $[\eta]^b$ ml/g | $M_{s\eta}{}^c$ $\times 10^{-6}$ |
|---|---|---|---|---|---|---|
| P | 0 | 6.0* | Plugged | 18.7* | 10400* | 12.8* |
| Q | 1 | 6.5 | Plugged | 14.4 | 8220 | 7.7 |
| R | 3 | 5.5 | 1000/5 | 11.4 | 5775 | 4.6 |
| S | 5 | 3.7 | 1000/9 | 9.7 | 3310 | 2.7 |
| T | 7 | 1.7 | Not Measured (viscosity too low) | 7.3 | 1073 | 1.00 |

*average values are reported
$^a$sedimentation coefficient
$^b$intrinsic viscosity
$^c$molecular weight Sample A: unheated control Sample B: heated 6 h at 121° C. in the presence of 2% NaCl, 0.2% CaCl$_2$ (same salts as regular Δ+, Δ=heat).

Sample C: heated 6 h at 121° C. in water preflushed with N$_2$ and containing 800 ppm Na$_2$SO$_3$ plus 0.4% NaCl.

Sample D: heated 6 h at 121° C. in 0.4% NaCl.

A summary of the results obtained is set forth in Table 2.

Saran Wrap and aluminum foil closure of the flasks in some cases.

Table 3 also shows that the addition of thiourea and isopropyl alcohol, which additives are described in the invention of Wellington, British Pat. No. 1,518,628, are not necessary to viscosity stabilization in the present saline heat-treatment process.

EXAMPLE 7

TABLE 2
EFFECT OF OXYGEN SCAVENGER ON DEGRADATION DURING HEAT-TREATMENT

| Sample | Heat-treat Time, h | Brookfield Viscosity* 600 ppm XC, 73 sec$^{-1}$/7.3 sec$^{-1}$ | Injectivity (ml thruput/ ml min$^{-1}$ @ 100 ml | Intrinsic Viscosity ml/g | $s_{20}$, W | $M_{s\eta}$ |
|---|---|---|---|---|---|---|
| A. Δ$^-$ | 0 | 6.9/17 | plugged | 12000 | 17 | 12 × 10$^6$ |
| B. Δ$^+$, 2.2% brine | 6 | 2.6/2.8 | 1000/>9** | 1700 | 7.6 | 1.3 × 10$^6$ |
| C. Δ$^+$, Na$_2$SO$_3$ + NaCl | 6 | 6.3/12 | 230/3*** | 5300 | 12.5 | 5 × 10$^6$ |
| D. Δ$^+$, NaCl only | 6 | 1.5/2 | **** | 600 | 6.3 | 0.6 × 10$^6$ |

*In cP, measured in 8% NaCl + 0.8% CaCl$_2$ at 20° C.
**Data from Table 1.
***Measured in 8% NaCl containing no CaCl$_2$.
****Not measured because viscosity was very low. Presumably injectivity would be satisfactory.

From the data in Table 2, it is clear that the large drop in [η] brought about by regular heat-treatment conditions in 2.2% brine is largely prevented by Na$_2$SO$_3$. This is especially noteworthy in comparing samples C and D, which have the same NaCl concentration. It should be noted that the lower salt concentrations in C and D generally lead to greater viscosity decreases in heat treatment at 121° C. for 1–3 hours.

EXAMPLE 6

Example 6 is directed to the effects of Na$_2$SO$_3$ on viscosity under differing concentrations and heating times. The procedure of Example 5 was followed in preparing samples, and results are summarized in Table 3.

TABLE 3
EFFECT OF Na$_2$SO$_3$ ON VISCOSITY AFTER HEAT TREATMENT AT 121° C.

| Sample | XC ppm | Na$_2$SO$_3$ ppm | NaCl ppm | Other Ingredients | Heat-treat Time, h | Viscosity* after heating, cP at shear rate 73 sec | 7.3 sec |
|---|---|---|---|---|---|---|---|
| a | 3000 | 300 | 20,000 | 3000 ppm thiourea, 4000 ppm IPA** | 5 | 5.7 | 12 |
| b | 3000 | 200 | 10,000 | 3000 ppm thiourea, 4000 ppm IPA | 4 | 5.0 | 6.8 |
| c | 800 | 200 | 800 | 400 ppm thiourea, 1000 ppm IPA | 3.5 | 6.4 | 13.5 |
| d | 800 | 200 | 800 | | 4 | 6.0 | 10.5 |
| e | 800 | 200 | 800 | | 4.5 | 7.4 | 14.5 |
| f | 3000 | 200 | 800 | | 4.5 | 5.0 | 6.5 |
| g | 3000 | 800 | 5000 | | 3 | 6.6 | 14 |
| h | 800 | 50 | 800 | 400 ppm thiourea, 1000 ppm IPA | 4 | 2.6 | 3.5 |
| i | 3000 | 600 | 800 | | 4 | 3.8 | 5 |
| j | 3000 | 600 | 300 | | 2.5 | 4.4 | 6.6 |
| k | 3000 | 1500 | 800 | | 3 | 6.3 | 12.5 |
| l | 3000 | 200 | 5000 | | 3 | 4.2 | 5.8 |

*viscosity (cP) measured at 600 ppm xanthan, 20,000 ppm NaCl, 20 to 25° C., with Brookfield UL viscometer.
**IPA = isopropyl alcohol.

Similar improvements in viscosity after heat-treatment in the presence of Na$_2$SO$_3$ are shown in Table 3. In some instances, almost no viscosity loss occurred after 4–5 hr. heating in the presence of Na$_2$SO$_3$, whereas in other apparently similar circumstances, some loss in viscosity occurred. It seems likely that the failure to flush the solutions with N$_2$ during the heat treatment in the sterilizer probably allowed oxygen to penetrate the The effects of using deoxygenated water and heating under an inert atmosphere are shown by this example. Xanthan samples (3000 ppm) were prepared as in example 5 using deoxygenated water. The salt concentration was adjusted to 2 wt. % NaCl, 0.05 M phosphate, pH 7. Samples were placed in glass reactors and sealed under air or nitrogen. Heating was for a period of 1–3 hours at 121° C., and results are summarized in Table 4.

TABLE 4
COMPARISON BETWEEN AIR AND NITROGEN BLANKETS DURING HEAT-TREATMENT AT 121° C.

| | | | Viscosity (cP) for 500 ppm Solution 73 sec$^{-1}$ | |
|---|---|---|---|---|
| Exp. No. | Gas | Time, h | Before Heating | After Heating |
| A | Air | 3 | 5.2 | 1.2 |
| B | Air | 1 | 5.2 | 1.4 |
| C | N$_2$ | 3 | 5.0 | 4.6 |

These data demonstrate that removal of air (oxygen) during heating stabilizes the heat treatment against viscosity loss. Xanthan solutions heated under N$_2$ were found to be easily filterable, and the filtered solutions passed the low-pressure Millipore ® injectivity test; i.e., they gave a flow rate of 10 ml/min. at 100 ml, 3 ml/min at 1000 ml, polymer concentration 600 ppm in 2% NaCl, 0.01 M phosphate buffer, pH 7.

We claim:

1. A process for recovering crude oil from a subterranean formation which comprises injecting an amount effective to provide mobility control of an aqueous solution containing heteropolysaccharides produced by the action of bacteria of the genus Xanthomonas, driving the displaced oil through the formation and recovering the displaced oil, wherein said heteropolysaccharide is stabilized against viscosity loss on heat treatment, if free of cell debris, has improved filterability and has been prepared by a process which comprises the steps of:

(a) preparing an aqueous solution which contains (i) from about 200 to about 30,000 parts per million by weight, of a heteropolysaccharide product produced by the bacterial fermentation of bacteria of the genus Xanthomonas, and (ii) at least about 0.5 weight percent of at least one inorganic salt to obtain a saline heteropolysaccharide solution;

(b) removing oxygen from said saline heteropolysaccharide solution;

(c) heating said saline heteropolysaccharide solution to a temperature of at least about 100° C. in an inert atmosphere;

(d) maintaining said saline heteropolysaccharide solution at a temperature of at least about 100° C. for a period of time sufficient to increase the injectivity and filterability characteristics of the heteropolysaccharide; and (e) removing or separating the proteinaceous materials and/or residual whole bacterial cells or other cell debris from the saline and heat-treated heteropolysaccharide product to thereby obtain a modified heteropolysaccharide capable of imparting a viscosity of at least 4.0 centipoises to an aqueous test solution containing 2 weight percent NaCl and 0.2 weight percent $CaCl_2$ when said modified heteropolysaccharide is added to said solution at a concentration of approximately 600 parts per million, by weight, as measured on a Brookfield viscosimeter with a UL adapter at 60 rpm at 25° C. and said modified heteropolysaccharide is further capable of imparting a filterability such that more than 1000 ml of a different aqueous test solution containing 8.8 weight percent salt comprised of NaCl and $CaCl_2$ on a 10:1 weight ratio and approximately 600 parts per million concentration, by weight, of said modified heteropolysaccharide will pass without plugging through a Millipore ® filter having a diameter of 13 mm and a pore size of about 5 microns at a constant pressure drop of about 1.55 psig.

2. The process of claim 1 wherein oxygen is removed by a chemical oxygen scavenger.

3. The process of claim 2 wherein the oxygen scavenger is dithionate, dithionite, sulfite, bisulfite, transition metal complex, aldehyde, hydroxylamine or hydrazine.

4. The process of claim 2 wherein the oxygen scavenger is a sulfite, bisulfite, dithionite or dithionate.

5. The process of claim 1 wherein the oxygen is removed by purging the aqueous, saline heteropolysaccharide solution with inert gas.

6. The process of claim 5 wherein the inert gas is $N_2$, Ar, He or hydrocarbon.

7. The process of claim 1 wherein oxygen is removed by purging the aqueous, saline heteropolysaccharide solution with inert gas followed by addition of chemical oxygen scavenger.

8. The process of claim 2 wherein the chemical oxygen scavenger is added in an amount sufficient to remove oxygen.

9. The process of claim 1 wherein heating occurs for from 60 to 400 minutes.

10. The process of claim 1 wherein the aqueous solution contains at least one surfactant.

11. The process of claim 1 wherein the aqueous solution contains a biocide.

12. The process of claim 1 wherein the heteropolysaccharide is produced by *Xanthomonas campestris*.

* * * * *